(12) United States Patent
Zhou

(10) Patent No.: US 11,184,829 B2
(45) Date of Patent: Nov. 23, 2021

(54) METHOD FOR INFORMATION TRANSMISSION ADJUSTMENT, BASE STATION, AND USER EQUIPMENT

(71) Applicant: Beijing Xiaomi Mobile Software Co., Ltd., Beijing (CN)

(72) Inventor: Juejia Zhou, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/784,027

(22) Filed: Feb. 6, 2020

(65) Prior Publication Data

US 2020/0178144 A1 Jun. 4, 2020

Related U.S. Application Data

(63) Continuation of application No. PCT/CN2017/097043, filed on Aug. 11, 2017.

(51) Int. Cl.
| | |
|---|---|
| *H04W 36/00* | (2009.01) |
| *H04W 36/30* | (2009.01) |
| *H04L 1/18* | (2006.01) |
| *H04W 24/08* | (2009.01) |
| *H04W 72/12* | (2009.01) |

(52) U.S. Cl.
CPC ............ *H04W 36/30* (2013.01); *H04L 1/1812* (2013.01); *H04W 24/08* (2013.01); *H04W 36/0011* (2013.01); *H04W 72/1231* (2013.01)

(58) Field of Classification Search
CPC ............. H04W 36/30; H04W 36/0011; H04W 72/1231; H04W 24/08; H04L 1/1812

USPC .................................. 455/436, 67.11, 67.13
See application file for complete search history.

(56) References Cited

U.S. PATENT DOCUMENTS

| 2013/0021926 A1 | 1/2013 | Geirhofer et al. |
| 2013/0028182 A1 | 1/2013 | Geirhofer et al. |
| 2015/0055588 A1 | 2/2015 | Yerramalli et al. |

(Continued)

FOREIGN PATENT DOCUMENTS

| CN | 101466127 A | 6/2009 |
| CN | 105493431 A | 4/2016 |

(Continued)

OTHER PUBLICATIONS

International Search Report in the International Application No. PCT/CN2017/097043, dated May 9, 2018.

(Continued)

*Primary Examiner* — Temica M Beamer

(74) *Attorney, Agent, or Firm* — Finnegan, Henderson, Farabow, Garrett & Dunner, L.L.P.

(57) ABSTRACT

A method for adjusting information transmission, includes: sending bandwidth part (BWP) switching information to user equipment (UE) through an upper layer message, the BWP switching information being configured to instruct the UE to switch from a first BWP for presently performing information transmission to a second BWP; monitoring preset uplink feedback information of the UE, the preset uplink feedback information being configured to indicate that the UE has received and parsed the BWP switching information; and upon receiving the preset uplink feedback information, stopping scheduling the UE on the first BWP.

18 Claims, 14 Drawing Sheets

(56) References Cited

U.S. PATENT DOCUMENTS

| | | | |
|---|---|---|---|
| 2015/0312015 A1* | 10/2015 | Chen | H04B 17/24 370/329 |
| 2017/0250787 A1 | 8/2017 | Geirhofer et al. | |
| 2019/0044771 A1* | 2/2019 | Bourlas | H04W 76/28 |
| 2019/0053246 A1* | 2/2019 | Olfat | H04L 27/0006 |

FOREIGN PATENT DOCUMENTS

| | | |
|---|---|---|
| CN | 106100713 A | 11/2016 |
| JP | 2016105562 A | 6/2016 |
| WO | WO 2013075507 A1 | 5/2013 |

OTHER PUBLICATIONS

English Translation of the Written Opinion of the International Search Authority in the International Application No. PCT/CN2017/097043, dated May 9, 2018.

Jiang el al., An Improved DSC Control of IM Using Band Width Prediction, Proceedings IPEMC 2000, Third International Power Electronics and Motion Control Conference (IEEE Cat. No. 00EX435), Aug. 15-18, 2000.

Liu et al., Design of Power Carrier Communication Module Data Acquisition System Based on BWP11B, Mechanical and Electrical Technology, Jun. 30, 2013.

Extended European Search Report in the European application No. 17920754.3, dated Feb. 12, 2021.

Huawei et al: "On bandwidth adaptation", 3GPP TSG RAN WG1 NR Ad-Hoc Meeting, R1-1711424, Qingdao, China, Jun. 27-30, 2017, 5 pages.

LG Electronics: "Discussion on Bandwidth Part Configurations", 3GPP TSG RAN WG1 Meeting Ad-Hoc, R1-1711574, Qingdao, P.R. China, Jun. 27-30, 2017, 5 pages.

ZTE: "Resource allocation for wideband operation", 3GPP TSG RAN WG1 NR Ad-Hoc#2, R1-1710126, Qingdao, P.R. China, Jun. 27-30, 2017, 6 pages.

Office Action of Indian Application No. 202047010094, dated Aug. 17, 2021.

* cited by examiner

METHOD FOR INFORMATION TRANSMISSION ADJUSTMENT, BASE STATION, AND USER EQUIPMENT

CROSS-REFERENCE TO RELATED APPLICATION

This application is a continuation of International Application No. PCT/CN2017/097043 filed on Aug. 11, 2017, the content of which is incorporated herein by reference in its entirety.

TECHNICAL FIELD

The present disclosure relates to the technical field of communication, and more particularly, to a method for adjusting information transmission, a base station, and user equipment (UE).

BACKGROUND 5G new radio (NR) may be deployed in a range of high frequencies from 3.3 GHz to 24 GHz, so each carrier frequency range in a 5G NR system may be larger than each carrier frequency range in a 4G long term evolution (LTE) system. In a 5G network, the bandwidth of a single band can be close to 1 GHz, and the bandwidth of a single carrier may be between 80 MHz and 400 MHz. A single carrier may be divided into multiple bandwidth parts (BWPs) for energy saving of UE of the 5G network. A base station may schedule UE on one or more BWPs.

SUMMARY

According to a first aspect of the embodiments of the present disclosure, a method for adjusting information transmission is provided. The method may be applied to a base station and include: sending BWP switching information to UE through an upper layer message, the BWP switching information being configured to instruct the UE to switch from a first BWP for presently performing information transmission to a second BWP; monitoring preset uplink feedback information of the UE, the preset uplink feedback information being configured to indicate that the UE has received and parsed the BWP switching information; and upon receiving the preset uplink feedback information, stopping scheduling the UE on the first BWP.

According to a second aspect of the embodiments of the present disclosure, a method for adjusting information transmission is provided. The method may be applied to UE and include: receiving and parsing BWP switching information sent by a base station; sending preset uplink feedback information to the base station, the preset uplink feedback information being configured to inform the base station that the BWP switching information has been received and/or parsed; and switching from a first BWP for presently performing information transmission to a second BWP according to the BWP switching information.

According to a third aspect of the embodiments of the present disclosure, a base station may include: a processor; and a memory configured to store instructions executable by the processor, wherein the processor is configured to: send BWP switching information to UE through an upper layer message, the BWP switching information being configured to instruct the UE to switch from a first BWP for presently performing information transmission to a second BWP; monitor preset uplink feedback information of the UE, the preset uplink feedback information being configured to indicate that the UE has received and parsed the BWP switching information; and stop, upon receiving the preset uplink feedback information, scheduling the UE on the first BWP.

According to a fourth aspect of the embodiments of the present disclosure, UE may include: a processor; and a memory configured to store instructions executable by the processor, wherein the processor is configured to: receive and parse BWP switching information sent by a base station; send preset uplink feedback information to the base station, the preset uplink feedback information being configured to inform the base station that the BWP switching information has been received and parsed; and switch, according to the BWP switching information, from a first BWP for presently performing information transmission to a second BWP.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Figure 1:
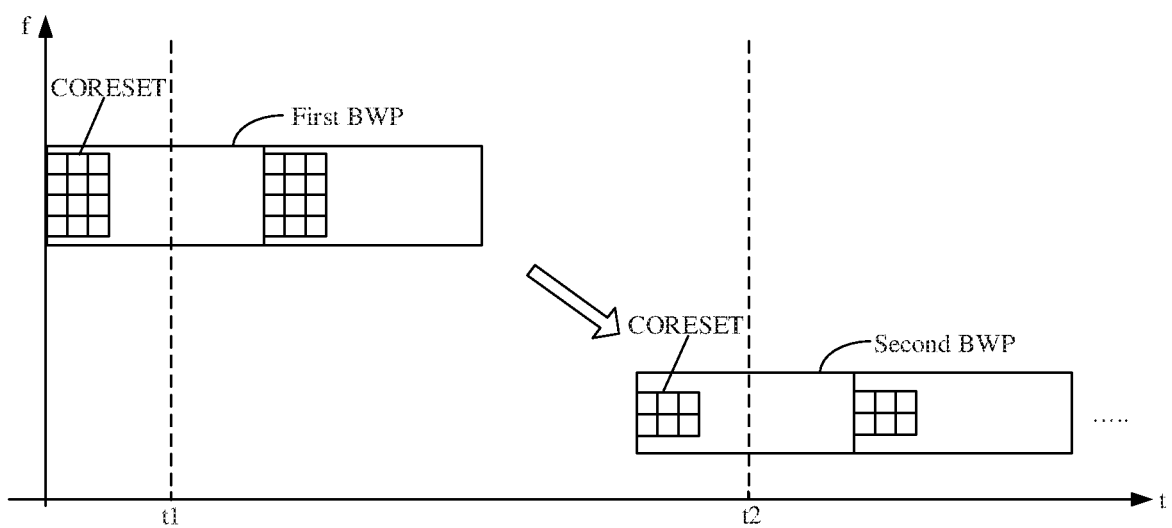
FIG. 1 is a schematic diagram illustrating an application scenario for adjusting information transmission according to an exemplary embodiment.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

5G new radio (NR) may be deployed in a range of high frequencies from 3.3 GHz to 24 GHz, so each carrier frequency range in a 5G NR system may be larger than each carrier frequency range in a 4G long term evolution (LTE) system. In a 5G network, the bandwidth of a single band can be close to 1 GHz, and the bandwidth of a single carrier may be between 80 MHz and 400 MHz. A single carrier may be divided into multiple bandwidth parts (BWPs) for energy saving of user equipment (UE) in the 5G network. A base station may schedule UE on one or more BWPs.

In an example that a base station schedules UE on a BWP such as BWP1, the base station needs to adjust a range of time-frequency resources for scheduling the UE due to changes in the present traffic to be transmitted or power consumption of the UE. For example, in order to save energy, BWP1 with a wider bandwidth such as 40 MHz can be adjusted to BWP2 with a narrower bandwidth such as 20 MHz.

The above method of adjusting the BWP is to deactivate the present BWP1 and then activate BWP2. During the above deactivation/activation process, a large amount of control signaling is needed due to reconfiguration of transmission control information of BWP2, which is generally implemented through upper layer messages such as radio resource control (RRC) messages.

In this process, after the base station sends a preset RRC message for instructing the UE to perform deactivation and activation, since an RRC message is mapped to a physical layer and sent to the UE, the UE may verify the message at an application layer and then map the message to a data layer. The process may take time and create a fuzzy period of about tens of milliseconds. During the above fuzzy period, the base station may not determine when the UE finishes receiving and parsing the preset RRC message. If the UE has not successfully switched to BWP2, the base station has canceled scheduling the UE on BWP1 and started scheduling the UE on BWP2, which may result in transmission loss. If the UE has successfully switched to BWP2 while the base station is still scheduling the UE on BWP1, transmission loss may also be caused and the user experience in use of 5G network devices may be degraded.

Embodiments of the present disclosure provide methods for information transmission adjustment. The methods may be performed by a base station or UE. The base station may be a base station, a sub-base station, or the like provided with a large-scale antenna array. The UE may be a user terminal, a user node, a mobile terminal, or a tablet. In some embodiments, the base station and the UE are independent of each other, and are in contact with each other to jointly implement the technical solution provided by the present disclosure.

An application scenario for adjusting information transmission provided by the present disclosure is: during the process of a base station scheduling UE, BWP switching information is sent to target UE through an upper layer message to inform the target UE of a method for deactivating a present BWP and then activating a new BWP to implement BWP conversion.

Based on the above application scenario, the present disclosure provides a method for adjusting information transmission, which can avoid transmission loss caused by the base station and the target UE in information transmission during a fuzzy period. FIG. 1 shows a schematic diagram of canceling scheduling the target UE by the base station on a first BWP too early and causing transmission loss according to an exemplary embodiment.

In the embodiment, a control resource set (CORESET) is provided on each BWP, as shown in FIG. 1. The CORESET may carry downlink control information (DCI) of the target UE. The DCI of the target UE may include: scheduling control information of the target UE, reference signal configuration, and the like.

Figure 2:
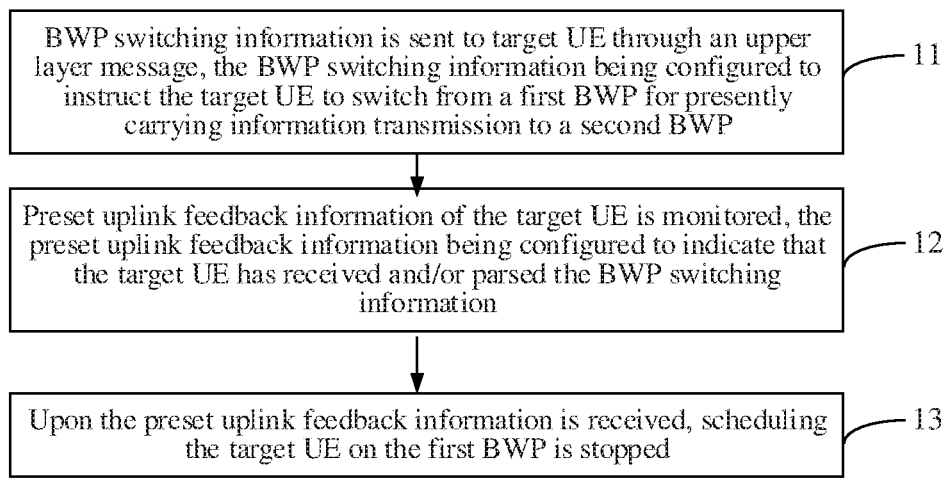
FIG. 2 is a flowchart illustrating a method for adjusting information transmission according to an exemplary embodiment.

FIG. 2 is a flowchart illustrating a method for adjusting information transmission according to an exemplary embodiment. The method is applied to a base station, and may include the following steps.

In step 11, BWP switching information is sent to target UE through an upper layer message, the BWP switching information being configured to instruct the target UE to switch from a first BWP for presently performing information transmission to a second BWP.

In the embodiment, the BWP switching information may include: deactivation control information for deactivating the present BWP that is the first BWP, and activation control information for activating the second BWP. The activation control information may include: authorization information and transmission configuration information.

In the embodiment, since deactivation of the first BWP and reactivation of the second BWP may require a large amount of control signaling, BWP switching information is sent to the target UE through an upper layer message. The upper layer message may be RRC signaling configured by the BWP switching information on an RRC layer or may be medium access control (MAC) control element (CE) signaling configured by the BWP switching information on a MAC layer.

In the embodiment, the timing for triggering the base station to send BWP switching information to the target UE may be that the base station initiatively decides to switch the BWP for the target UE according to the present traffic of the first BWP to be transmitted or the power consumption demand; or the base station may passively decide to switch the BWP for the target UE in response to the request from the target UE, which is not limited in the present disclosure.

In step 12, preset uplink feedback information of the target UE is monitored, the preset uplink feedback information being configured to indicate that the target UE has received and/or parsed the BWP switching information.

The implementation of step 12 may include the following two cases:

In the first case, after time t1, the base station may monitor preset uplink feedback information of the target UE on the first BWP.

Figure 3:
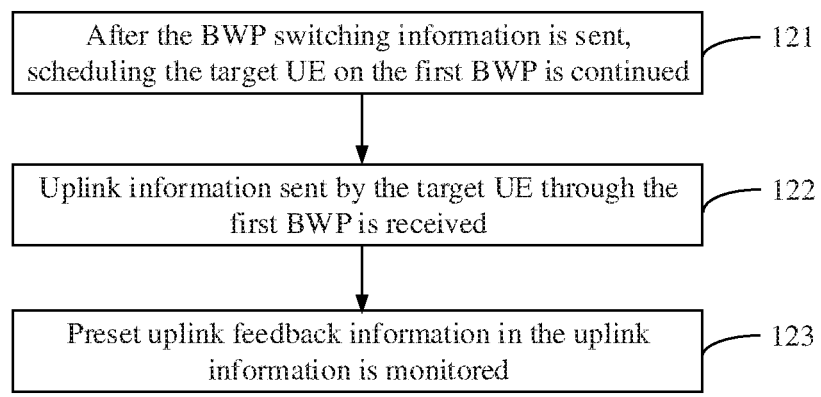
FIG. 3 is a flowchart illustrating a method for adjusting information transmission according to an exemplary embodiment.

FIG. 3 is a flowchart illustrating a method for adjusting information transmission according to an exemplary embodiment. In FIG. 3, step 12 may further include the following steps.

In step 121, after the BWP switching information is sent, scheduling the target UE on the first BWP is continued.

Figure 4A:
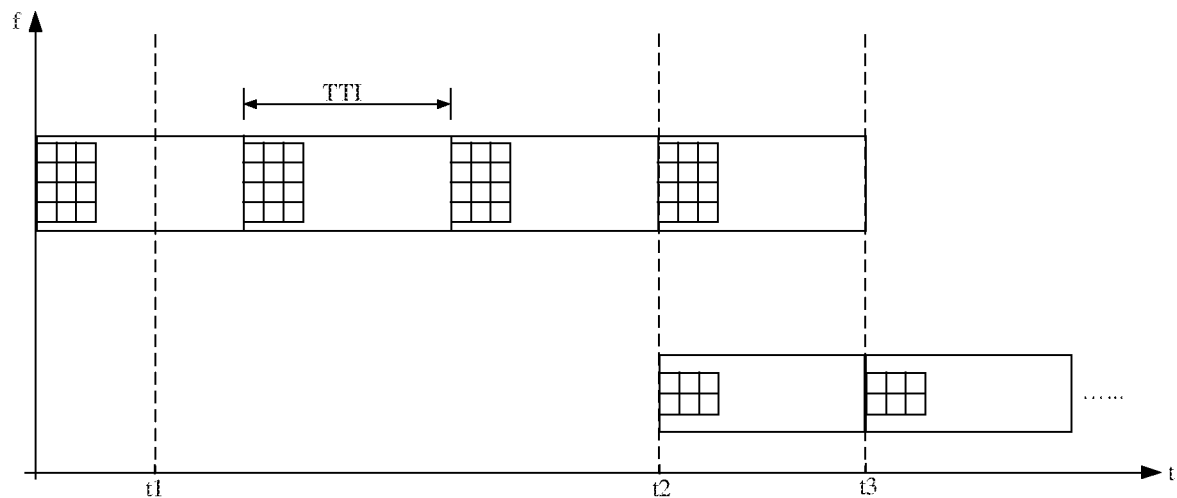
FIG. 4A is a schematic diagram illustrating a scenario for adjusting information transmission according to an exemplary embodiment.

FIG. 4A is a schematic diagram illustrating an application scenario for adjusting information transmission according to an exemplary embodiment. It is assumed that the time when the base station sends BWP switching information to the target UE through RRC signaling is t1, since it takes time to map an RRC message to a physical layer, transmit the RRC message to the target UE, pass information verification of the target UE and parse data, the target UE may not immediately work on the second BWP to which the first BWP is switched. It is assumed that the time required for the above process is 50 ms, in the embodiment, within a time range of t1+50 ms, the base station may continue to schedule the target UE on the first BWP for downlink transmission and uplink transmission.

In step 122, uplink information sent by the target UE through the first BWP is received.

After Lime t1, the base station may continue to schedule the target UE on the first BWP to ensure that the base station can continuously receive uplink information from the target UE on the first BWP. The above uplink information may include: uplink data continuously transmitted; uplink control information (UCI), such as hybrid automatic repeat request (HARQ) feedback information for downlink data transmission, including ACK/NACK information; and feedback information indicating the receiving and/or parsing status of the BWP switching information.

The feedback information may include at least one of: a receiving success message for informing the base station of the received BWP switching information; a receiving failure message for informing the base station of parsing failure of the BWP switching information; a parsing success message for informing that the base station has successfully parsed the BWP switching information; or a configuration completion message for informing that the base station has successfully parsed the BWP switching information and completed transmission configuration of the second BWP according to the BWP switching information.

In step 123, preset uplink feedback information in the uplink information is monitored.

After time t1, while receiving uplink information from the target UE on the first BWP, the base station may also monitor the uplink information to determine whether the uplink information includes preset uplink feedback information. The preset uplink feedback information may include any one of: a receiving success message for indicating that the target UE has received the BWP switching information; a parsing success message for indicating that the target UE has successfully parsed the BWP switching information; or a configuration completion message for indicating that the target UE has successfully parsed the BWP switching information and completed transmission configuration of the second BWP according to the BWP switching information.

In the second situation, after time t1, the base station may also monitor preset uplink feedback information of the target UE on both the first BWP and the second BWP simultaneously.

Figure 5:
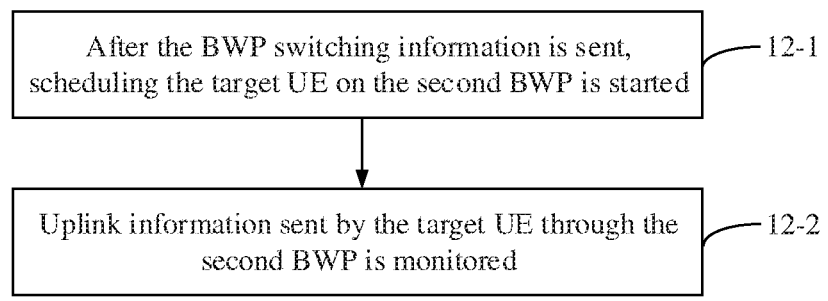
FIG. 5 is a flowchart illustrating a method for adjusting information transmission according to an exemplary embodiment.

FIG. 5 is a flowchart illustrating a method for adjusting information transmission according to an exemplary embodiment. On the basis of the embodiment shown in FIG. 3, step 12 may further include the following steps.

In step 12-1, after the BWP switching information is sent, scheduling the target UE on the second BWP is started.

Figure 6A:
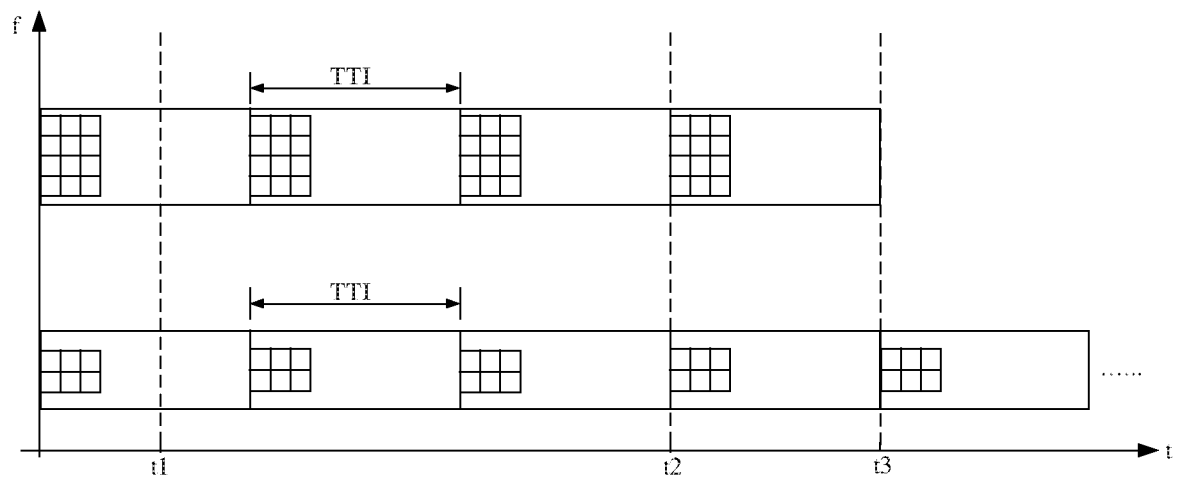
FIG. 6A is a schematic diagram illustrating a scenario for adjusting information transmission according to an exemplary embodiment.
Figure 6B:
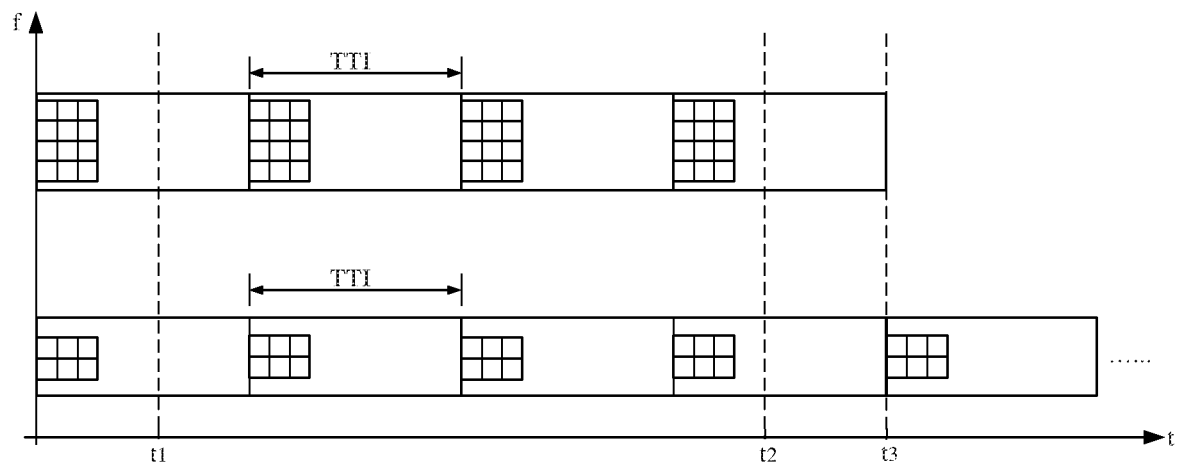
FIG. 6B is a schematic diagram illustrating a scenario for adjusting information transmission according to an exemplary embodiment.

In an embodiment, the base station may start scheduling the target UE on the second BWP from time t1, and may be ready to receive uplink information sent by the target UE through the second BWP at any time. FIG. 6A and FIG. 6B illustrate schematic diagrams of an application scenario for adjusting information transmission according to exemplary embodiment.

In the embodiment, the base station may allocate time-frequency resources to the target UE on both the first BWP and the second BWP, and simultaneously transmit downlink data sent to the target UE on the second BWP. Regardless of presently working on the first BWP or the second BWP, the target UE can transmit information to and receive information from the base station, thereby effectively avoiding the loss of information transmission and improving the reliability of information transmission.

Figure 6C:
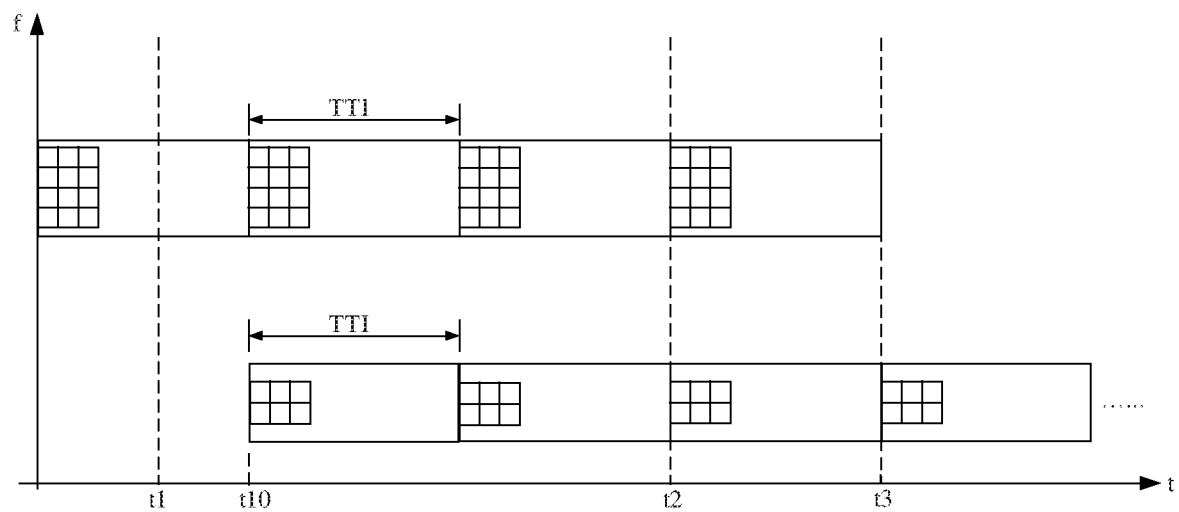
FIG. 6C is a schematic diagram illustrating a scenario for adjusting information transmission according to an exemplary embodiment.

In another embodiment, the base station may also start scheduling the target UE on the second BWP after a preset interval duration from time t1, for example, at time t10 in FIG. 6C, and it is assumed that t10=t1+1 ms. The preset interval duration may be a duration determined by the base station according to prior information, such as 1 ms. The base station may determine, based on historical experience values, that the target UE may not complete a BWP handover process within the preset interval, as shown in FIG. 6C. In the embodiment, transmission resources can be saved on the basis of ensuring the reliability of information transmission.

In step 12-2, uplink information sent by the target UE through the second BWP is monitored.

In the embodiment, the base station may simultaneously monitor any information sent by the target UE on the second BWP. Once receiving the uplink information sent by the target UE through the second BWP, the base station may determine that the target UE has completed the configuration of the second BWP, and may safely cancel scheduling the target UE on the first BWP.

The uplink information sent by the target UE through the second BWP may include at least one of: measurement information of a reference signal on the second BWP, such as CQI feedback information; HARQ feedback information for downlink data transmission, that is. ACK/NACK information, including: HARQ feedback information for downlink data transmission carried by the first BWP, and/or HARQ feedback information for downlink data transmission carried by the second BWP; or preset uplink feedback information indicating that the BWP switching information has been successfully received and/or parsed.

Referring back to FIG. 2, in step 13, upon the preset uplink feedback information is received, scheduling the target UE on the first BWP is stopped.

According to different preset uplink feedback information received by the base station, the specific implementation manner of step 13 is also different.

Corresponding to the first situation above, step 13 may include: upon the base station detects, by monitoring on the first BWP, the receiving success message and/or configuration completion message sent by the target UE, it can be determined that the target UE already has qualified for activating the second BWP; or, responsive to determining that the target UE has activated the second BWP, scheduling the target UE on the first BWP may be stopped, which may include at least the following four implementation manners.

In the first manner, upon the receiving success message sent by the target UE is received, scheduling the target UE on the second BWP may be started, and scheduling the target UE on the first BWP may be stopped after a first preset waiting duration.

In the embodiment, after receiving the BWP switching information, the target UE needs to take time to parse the information and complete the process of configuring the scheduling control information of the second BWP according to activation control information in the BWP switching information. Therefore, after receiving the receiving success message, the base station may start scheduling the target UE on the second BWP, and stop scheduling the target UE on the first BWP after a first preset waiting duration. The preset waiting duration may be a duration determined by the base station according to historical experience, such as a transmission time interval (TTI).

As shown in FIG. 4A, for example, when the base station schedules the target UE, a basic information transmission unit in a time domain is one TTI. It is assumed that the base station successfully receives the receiving success message from the physical layer at time 12. Then the base station may schedule the target UE on the second BWP from time t2, and stop scheduling the target UE on the first BWP after one TTI.

In FIG. 4A, the first preset waiting duration may be an interval duration Δt1 between t2 and t3, that is, a TTI duration.

In the second manner, after receiving the parsing success message, the base station may stop scheduling the target UE on the first BWP after a second preset waiting duration, and start to schedule the target UE on the second BWP.

Similar to the first manner, in a case that the base station receives the parsing success message sent by the target UE through the first BWP, it indicates that the target UE has successfully parsed the deactivation control information and the activation control information, but it also may take time for the target UE to perform deactivation and activation according to the above information, especially it may take time to configure the scheduling control information of the second BWP. Therefore, after receiving the parsing success message, the base station cancels scheduling the target UE on the first BWP after a second preset waiting duration. It can be predicted that the second preset waiting duration is shorter than the first preset waiting duration.

Figure 4B:
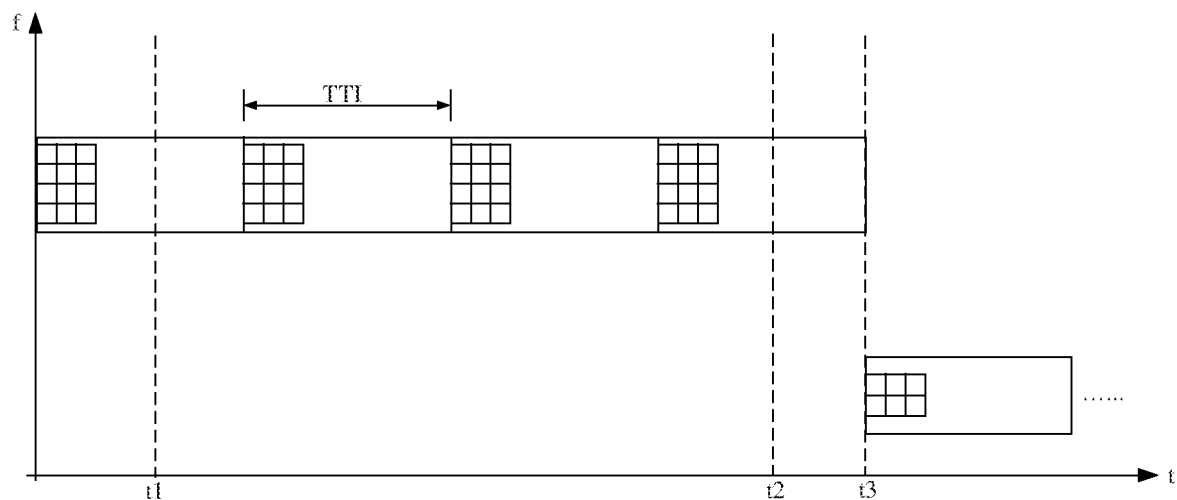
FIG. 4B is a schematic diagram illustrating a scenario for adjusting information transmission according to an exemplary embodiment.

As shown in FIG. 4B, it is assumed that the base station receives the parsing success message from an upper layer such as an RRC layer at time t2, it can stop scheduling the target UE on the first BWP after the presently scheduled TTI transmission is completed, that is, at time t3, and start scheduling the target UE on the second BWP.

It can be seen that the second preset waiting duration in FIG. 4B, that is, an interval duration Δt2 between t2 and t3, is shorter than the first preset waiting duration shown in FIG. 4A, that is, the interval duration Δt1 between t2 and t3 shown in FIG. 4A, namely one TTI.

In the third manner, after receiving the configuration completion message, the base station may stop scheduling the target UE on the first BWP, and start to schedule the target UE on the second BWP.

Upon the base station receives the configuration completion message from the target UE, it can be determined that the target UE is ready to activate the second BWP before sending the message, and the time required for the above message transmission is sufficient for the target UE to perform a handover between deactivation and activation. Therefore, after receiving the configuration completion message, the base station may stop scheduling the target UE on the first BWP and start to schedule the target UE on the second BWP.

In this case, before receiving the preset uplink feedback information, the base station may keep scheduling the target UE on the first BWP to ensure that information transmission between the target UE and the base station will not be interrupted, which effectively avoids information transmission loss caused by BWP switching.

In the fourth manner, upon uplink information sent by the target UE through the second BWP is received, scheduling the target UE on the first BWP is stopped.

For the second situation, when the base station schedules the first BWP and the second BWP simultaneously, uplink information sent by the target UE through the second BWP may be first received, and then it can be determined that the target UE has successfully activated the second BWP. Therefore, scheduling the first BWP may be stopped.

Corresponding to the second situation, step 13 may include: upon the base station first detects, by monitoring, the uplink information of the target UE on the second BWP, scheduling the target UE on the first BWP may be stopped.

In a case that the base station first detects, by monitoring, the preset uplink feedback information of the target UE on the first BWP, scheduling the target UE on the first BWP may be stopped according to the first manner to the third manner, as shown in FIG. 6A and FIG. 6B. In the embodiment, the reliability of information transmission of the target UE can be improved during the BWP handover process.

In another embodiment, the base station may also configure a transmission mode of HARQ feedback information for downlink data transmission.

Figure 7:
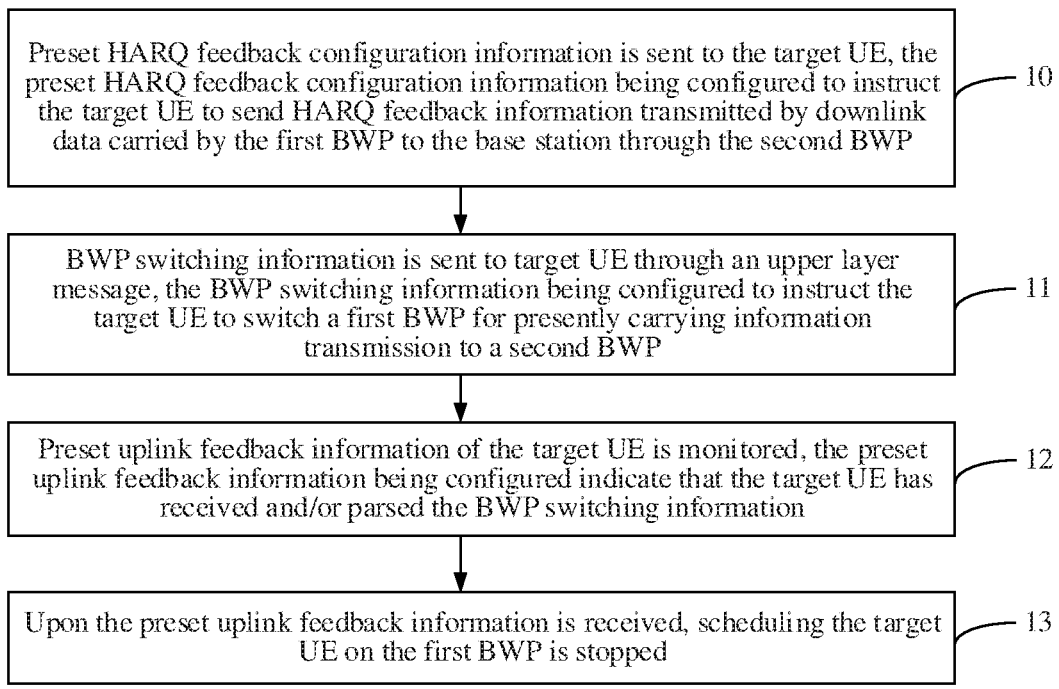
FIG. 7 is a flowchart illustrating a method for adjusting information transmission according to an exemplary embodiment.

FIG. 7 is a flowchart illustrating a method for adjusting information transmission according to an exemplary embodiment. On the basis of the embodiment shown in FIG. 2, before step 11, the method may include the following step.

In step 10, preset HARQ feedback configuration information is sent to the target UE, the preset HARQ feedback configuration information being configured to instruct the target UE to send HARQ feedback information transmitted by downlink data carried by the first BWP to the base station through the second BWP.

In another embodiment, the base station may send preset HARQ feedback configuration information to the target UE at time t1 when sending the BWP switching information, and inform the target UE that the HARQ feedback information for downlink data transmission received on the present BWP may be sent to the base station through the second BWP.

In the embodiment, the base station may send the above HARQ feedback configuration information to the target UE through broadcast signaling, upper layer signaling, or physical downlink control channel (PDCCH) signaling of a physical layer. The upper layer signaling may be RRC signaling or MAC CE signaling.

In this manner, the target UE does not need to wait until HARQ feedback information is sent for all scheduled downlink data transmissions before performing BWP switching. In a case that the HARQ feedback information of the last downlink data transmission has not been sent through the first BWP when the last data transmission is completed, BWP switching may also be performed, and the HARQ feedback information of the last downlink data transmission on the first BWP may be sent to the base station through the switched second BWP according to regulations of the preset HARQ feedback configuration information, which will not result in loss of HARQ feedback information in downlink data transmission. In a case that the HARQ feedback information is NACK information, the base station may retransmit data on the second BWP, thereby improving the reliability of information transmission.

By using the method for adjusting information transmission provided by the present disclosure, after a base station sends a BWP switching message to target UE through an upper layer message, a status that BWP switching is completed by the target UE can be clearly determined by monitoring preset uplink feedback information, so that after the preset uplink feedback information is received, scheduling the target UE on a first BWP can be canceled, and scheduling the target UE on a second BWP can be started or maintained, thereby effectively avoiding information transmission loss caused by stopping scheduling the target UE on the first BWP too early or too late due to the fact that the base station cannot determine a status that the target UE receives and parses the BWP switching message when instructing the UE to switch BWPs through an upper layer message, ensuring that the target UE will not lose information transmission when switching BWPs in an information transmission process, and effectively improving the reliability of information transmission in a BWP handover process.

Figure 8:
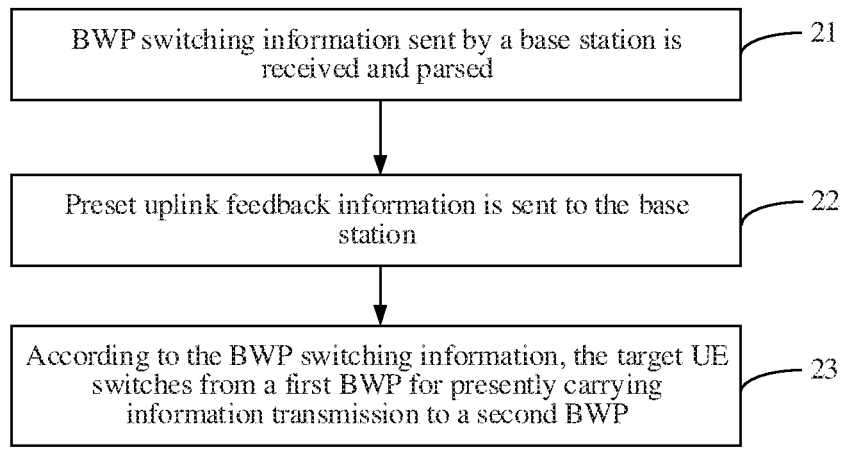
FIG. 8 is a flowchart illustrating a method for adjusting information transmission according to an exemplary embodiment.

Correspondingly, the present disclosure provides a method for adjusting information transmission, applied to UE. FIG. 8 is a flowchart illustrating a method for adjusting information transmission according to an exemplary embodiment. The method may include the following steps.

In step 21, BWP switching information sent by a base station is received and parsed.

Corresponding to step 11, the target UE may receive and parse the BWP switching information sent by the base station in the presently working BWP, that is, the first BWP.

In step 22, preset uplink feedback information is sent to the base station.

According to the status of the target UE receiving and parsing the BWP switching information, the preset feedback information to indicate that the BWP switching information has been received and/or successfully parsed may be sent to the base station, corresponding to step 12.

In an embodiment, the target UE may send preset uplink feedback information to the base station through the first BWP.

The target UE may be triggered to send preset uplink feedback information at the following three timings.

In the first timing, after the BWP switching information is received, such as at time T1, a receiving success message may be sent to the base station to inform the base station that the BWP switching information has been received.

Exemplarily, the time T1 may be time t2 shown in FIG. 4A, FIG. 6A, and FIG. 6C.

In the second timing, after the target UE receives and successfully parses the BWP switching information, such as at time T2, a parsing success message may be sent to the base station to inform the base station that the activation control information of the second BWP has been successfully parsed.

In the third timing, the target UE may successfully parse the activation control information of the second BWP and complete the configuration of the scheduling control information of the second BWP according to the activation control information, such as at time T3, a configuration completion message may be sent to the base station to inform the base station that the second BWP is about to be activated.

In a case that the above parsing success message and configuration completion message are upper layer response messages, such as RRC response messages, the times T2 and T3 exemplarily may be times t2 shown in FIG. 4B and FIG. 6B.

It can be seen that the trigger timing of preset uplink feedback is different, and the transmitted uplink feedback information is also different. It is foreseeable that time T1 is earlier than time T2 and time T2 is earlier than time T3.

For the uplink feedback information sent at different times, the base station may decide to stop scheduling the target UE on the first BWP at different timings, with reference to the description of different implementation manners in step 13.

In another embodiment, the preset uplink feedback information may also be any uplink information sent on the second BWP after the target UE activates the second BWP.

In step 23, according to the BWP switching information, the target UE switches from a first BWP for presently performing information transmission to a second BWP.

Figure 9:
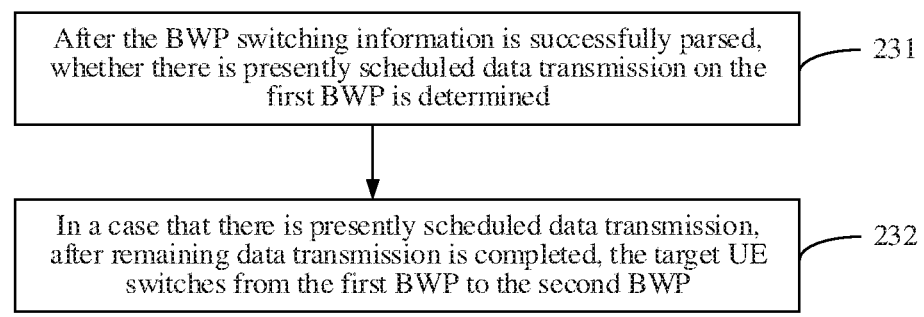
FIG. 9 is a flowchart illustrating a method for adjusting information transmission according to an exemplary embodiment.

In the embodiment, after receiving and parsing the BWP switching information, the target UE may switch the BWPs, that is, perform the operations of deactivating the first BWP and activating the second BWP, at different timings. FIG. 9 is a flowchart illustrating a method for adjusting information transmission according to an exemplary embodiment. In FIG. 9, step 23 may include the following steps.

In step 231, after the BWP switching information is successfully parsed, whether there is presently scheduled data transmission on the first BWP is determined.

Referring to the schematic diagrams of the application scenarios shown in FIG. 4A, FIG. 4B, and FIG. 6A to FIG. 6C, when the target UE receives and parses the BWP switching information and performs transmission configuration according to the BWP switching information, the base station may continue scheduling the target UE on the first BWP. When the target UE completes the above operations, whether there is presently scheduled uplink data transmission and/or downlink data transmission may be determined.

In step 232, in a case that there is presently scheduled data transmission, after remaining data transmission is completed, the target UE switches from the first BWP to the second BWP.

The remaining data transmission may include: remaining downlink data transmission and remaining uplink data transmission. In each of the above schematic diagrams, the time t3 may also be understood as the time when the target UE switches the BWPs.

In the embodiment, in order to avoid loss of output transmission or unnecessary retransmission, the target UE may perform BWP switching after the presently scheduled data transmission is completed.

In an embodiment, for the preset uplink feedback information sending time, that is, time t2, in a case that there is remaining downlink data transmission, the target UE may determine the BWP switching timing according to the present HARQ feedback transmission configuration information.

Figure 10:
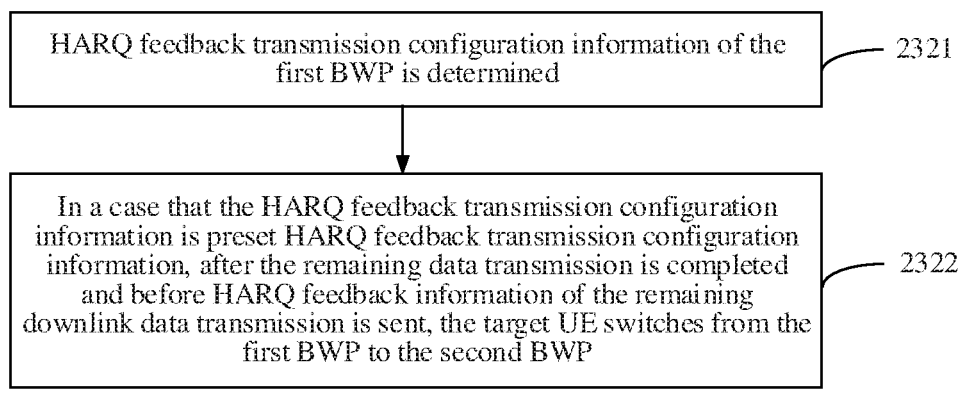
FIG. 10 is a flowchart illustrating a method for adjusting information transmission according to an exemplary embodiment.

FIG. 10 is a flowchart illustrating a method for adjusting information transmission according to an exemplary embodiment. In FIG. 10, step 231 may include the following steps.

In step 2321, HARQ feedback transmission configuration information of the first BWP is determined.

In the embodiment, the mode of sending HARQ feedback information for downlink data transmission by the target UE may be a fixed mode preset by a protocol, or may be configurable, that is, configured in time according to the HARQ feedback transmission configuration information sent by the base station.

In the embodiment, the HARQ feedback transmission configuration for downlink data transmission carried by the first BWP may include the following two configuration manners.

In the first configuration manner, HARQ feedback information transmitted by downlink data carried by the first BWP may be sent to the base station through the first BWP.

Step 232 is: after the remaining data transmission is completed and HARQ feedback information of the remaining downlink data transmission is sent, the target UE switches from the first BWP to the second BWP. The remaining data transmission here may include: uplink remaining transmission and downlink remaining data transmission carried by the first BWP. The uplink remaining transmission may include: uplink remaining data transmission and uplink control information transmission. The uplink control information transmission may include at least: HARQ feedback information transmission in the last downlink data transmission.

In the second configuration manner, HARQ feedback information transmitted by downlink data carried by the first BWP may be sent to the base station through the second BWP.

The preset HARQ feedback transmission configuration information for the second configuration manner may be HARQ feedback information for instructing the UE to send HARQ feedback information transmitted by downlink data carried by the first BWP to the base station through the second BWP.

Corresponding to the second configuration manner, the target UE may acquire the preset HARQ feedback transmission configuration information before step 21, with reference to step 10 (FIG. 7).

In another embodiment, the preset HARQ feedback transmission configuration information may also be included in the BWP switching information and sent to the target UE. Correspondingly, the target UE may obtain the preset HARQ feedback transmission configuration information when parsing the BWP switching information, and determine the timing of switching the BWPs accordingly.

For the second configuration manner, step 232 may include the following steps.

In step 2322, in a case that the HARQ feedback transmission configuration information is preset HARQ feedback transmission configuration information, after the remaining data transmission is completed and before HARQ feedback information of the remaining downlink data transmission is sent, the target UE switches from the first BWP to the second BWP.

In the embodiment, the target UE may switch from the first BWP to the second BWP without waiting for completion of the HARQ feedback information transmission of the remaining downlink data transmission. In the case where the base station schedules the first BWP and the second BWP simultaneously, invalid transmission resources can be effectively saved.

Correspondingly, for the second situation, when the base station first receives the HARQ feedback information sent by the target UE through the second BWP, the HARQ feedback information for the last downlink data transmission may be received on the first BWP.

With the method for adjusting information transmission provided by the present disclosure, before being ready to switch BWPs, UE may first send preset uplink feedback information to a base station, the preset uplink feedback information being used to inform the base station that target UE has received and/or parsed BWP switching information, so that the base station can clarify a status of the target UE when the BWP switching information is processed according to the preset uplink feedback information, scheduling the target UE on a first BWP may be canceled when it is determined that the target UE has activated the second BWP at an appropriate time, it can ensured that information transmission between the base station and the target UE will not be lost due to BWP switching, and the reliability of information transmission can be effectively improved.

For illustrative purpose, each of the above method embodiments is described as a combination of a series of operations, but those skilled in the art should know that the present disclosure is not limited to the described operation sequence because some steps may be executed in other sequences or at the same time according to the present disclosure.

Corresponding to the above methods embodiments, the present disclosure also provides device embodiments.

Figure 11:
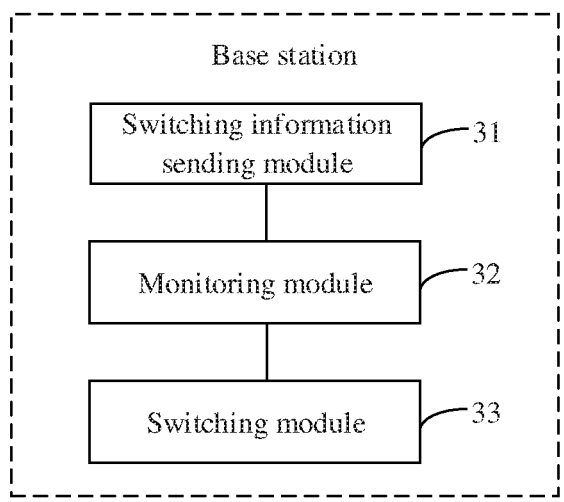
FIG. 11 is a block diagram illustrating a base station according to an exemplary embodiment.

FIG. 11 is a block diagram illustrating a base station according to an exemplary embodiment. The base station may include: a switching information sending module 31, a monitoring module 32 and a switching module 33.

The switching information sending module 31 is configured to send BWP switching information to target UE through an upper layer message, the BWP switching information being configured to instruct the target UE to switch from a first BWP for presently performing information transmission to a second BWP.

The monitoring module 32 is configured to monitor preset uplink feedback information of the target UE, the preset uplink feedback information being configured to indicate that the target UE has received and/or parsed the BWP switching information.

The switching module 33 is configured to stop, upon the preset uplink feedback information is received, scheduling the target UE on the first BWP.

Figure 12:
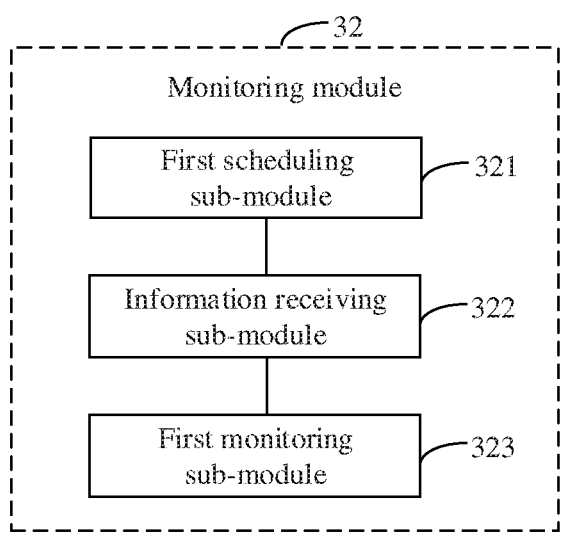
FIG. 12 is a block diagram illustrating a base station according to an exemplary embodiment.

FIG. 12 is a block diagram illustrating a base station according to an exemplary embodiment. On the basis of the embodiment of the base station shown in FIG. 11, the monitoring module 32 may include: a first scheduling sub-module 321, an information receiving sub-module 322 and a first monitoring sub-module 323.

The first scheduling sub-module 321 is configured to continue, after the BWP switching information is sent, scheduling the target UE on the first BWP.

The information receiving sub-module 322 is configured to receive uplink information sent by the target UE through the first BWP.

The first monitoring sub-module 323 is configured to monitor preset uplink feedback information in the uplink information.

In the embodiment, the preset uplink feedback information includes any one of: a receiving success message for indicating that the target UE has received the BWP switching information; a parsing success message for indicating that the target UE has successfully parsed the BWP switching information; or a configuration completion message, for indicating that the target UE has successfully parsed the BWP switching information and completed transmission configuration of the second BWP according to the BWP switching information.

Figure 13:
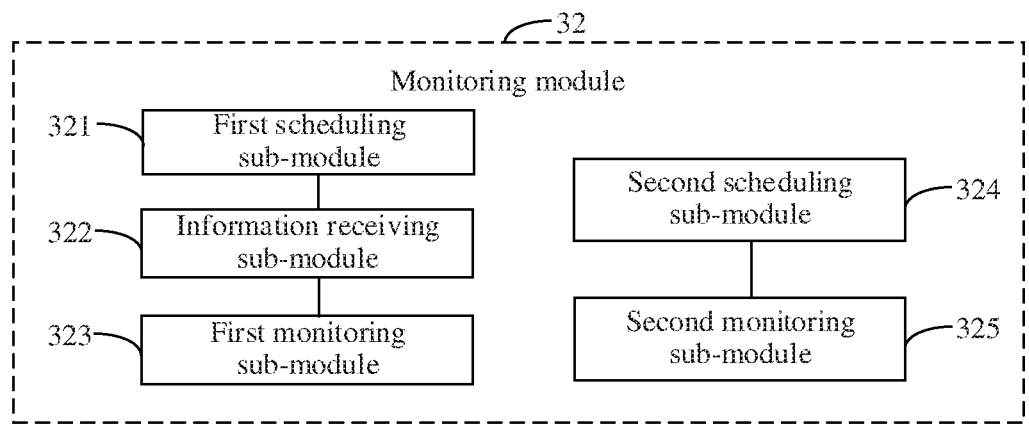
FIG. 13 is a block diagram illustrating a base station according to an exemplary embodiment.

FIG. 13 is a block diagram illustrating a base station according to an exemplary embodiment. On the basis of the embodiment of the base station shown in FIG. 12, the monitoring module 32 may further include: a second scheduling sub-module 324 and a second monitoring sub-module 325.

The second scheduling sub-module 324 is configured to start, after the BWP switching information is sent, to schedule the target UE on the second BWP.

The second monitoring sub-module 325 is configured to monitor uplink information sent by the target UE through the second BWP.

Figure 14:
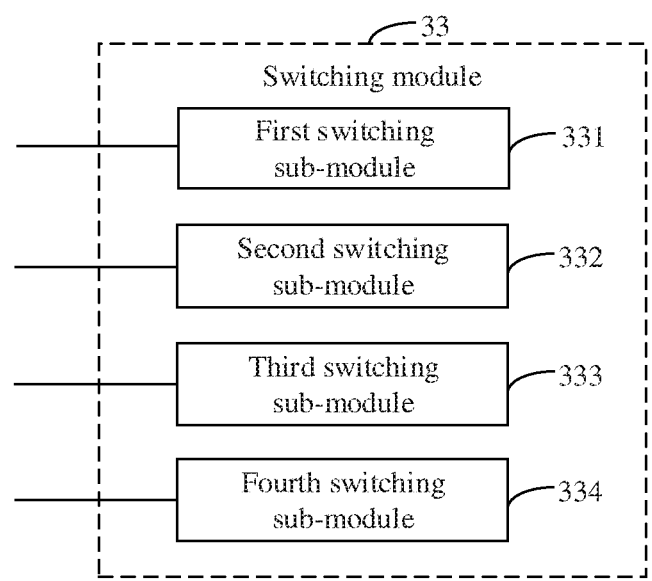
FIG. 14 is a block diagram illustrating a base station according to an exemplary embodiment.

FIG. 14 is a block diagram illustrating a base station according to an exemplary embodiment. On the basis of the base station embodiment shown in FIG. 12 or 13, the switching module 33 may include any one of: a first switching sub-module 331, a second switching sub-module 332, a third switching sub-module 333, and a fourth switching sub-module 334.

The first switching sub-module 331 is configured to start, upon the receiving success message is received, to schedule the target UE on the second BWP, and stop scheduling the target UE on the first BWP after a first preset waiting duration.

The second switching sub-module 332 is configured to stop, upon the parsing success message is received, scheduling the target UE on the first BWP after a second preset waiting duration, and start to schedule the target UE on the second BWP.

The third switching sub-module 333 is configured to stop, upon the configuration completion message is received, scheduling the target UE on the first BWP, and start to schedule the target UE on the second BWP.

The fourth switching sub-module 334 is configured to stop, upon uplink information sent by the target UE through the second BWP is received, scheduling the target UE on the first BWP.

Figure 15:
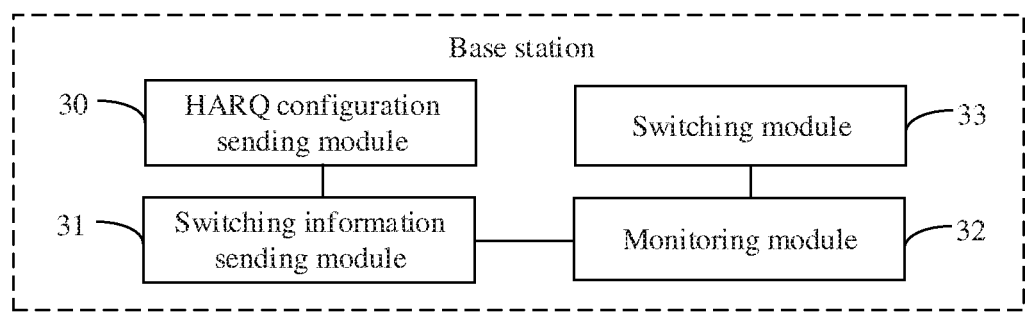
FIG. 15 is a block diagram illustrating a base station according to an exemplary embodiment.

FIG. 15 is a block diagram illustrating a base station according to an exemplary embodiment. On the basis of the embodiment of the base station shown in FIG. 11, the base station may further include: an HARQ configuration sending module 30.

The HARQ configuration sending module 30 is configured to send, before or when the BWP switching information is sent, preset HARQ feedback configuration information to the target UE, the preset HARQ feedback configuration information being configured to instruct the target UE to send HARQ feedback information transmitted by downlink data carried by the first BWP to the base station through the second BWP.

Figure 16:
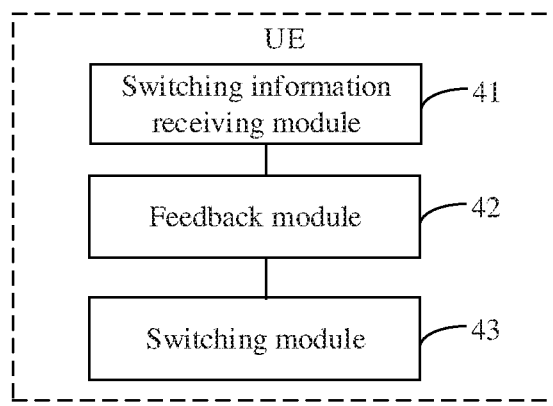
FIG. 16 is a block diagram illustrating UE according to an exemplary embodiment.

Correspondingly, the present disclosure also provides UE. FIG. 16 is a block diagram illustrating UE according to an exemplary embodiment. The UE may include: a switching information receiving module 41, a feedback module 42 and a switching module 43.

The switching information receiving module 41 is configured to receive and parse BWP switching information from a base station.

The feedback module 42 is configured to send preset uplink feedback information to the base station, the preset uplink feedback information being configured to inform the base station that the BWP switching information has been received and/or parsed.

The switching module 43 is configured to switch the UE, according to the BWP switching information, from a first BWP for presently performing information transmission to a second BWP.

Figure 17:
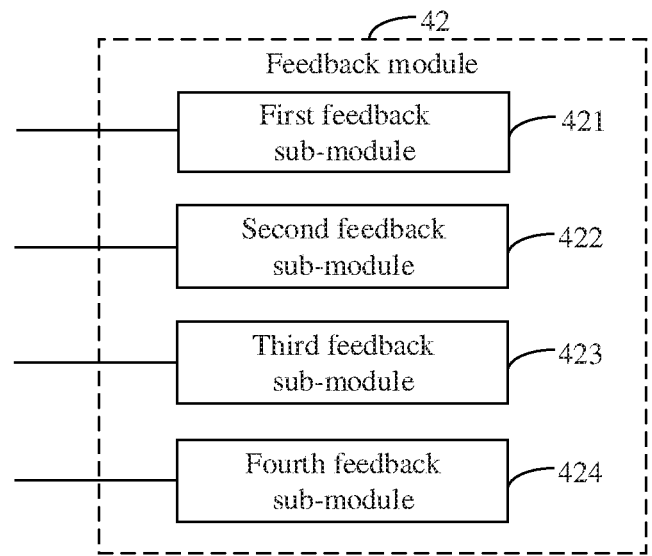
FIG. 17 is a block diagram illustrating UE according to an exemplary embodiment.

FIG. 17 is a block diagram illustrating UE according to an exemplary embodiment. On the basis of the UE embodiment shown in FIG. 16, the feedback module 42 may include any one of the following sub-modules: a first feedback sub-module 421, a second feedback sub-module 422, a third feedback sub-module 423, and a fourth feedback sub-module 424.

The first feedback sub-module 421 is configured to send, after the BWP switching information is received, a receiving success message to the base station through the first BWP.

The second feedback sub-module 422 is configured to send, after the BWP switching information is successfully parsed, a parsing success message to the base station through the first BWP.

The third feedback sub-module 423 is configured to send, after the configuration of scheduling control information of the second BWP is completed according to the parsed BWP switching information, a configuration completion message to the base station through the first BWP.

The fourth feedback sub-module 424 is configured to send, after the second BWP according to the BWP switching information is activated, downlink information to the base station through the second BWP.

Figure 18:
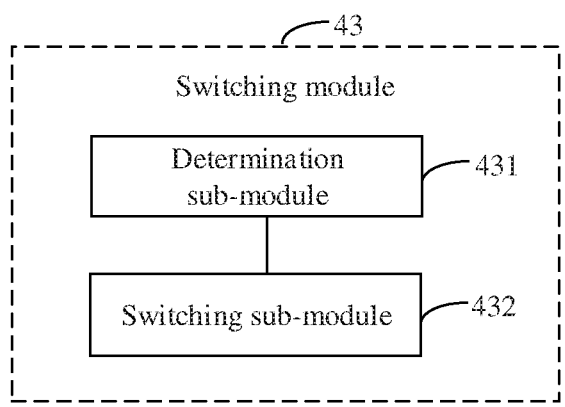
FIG. 18 is a block diagram illustrating UE according to an exemplary embodiment.

FIG. 18 is a block diagram illustrating UE according to an exemplary embodiment. On the basis of the UE embodiment shown in FIG. 16, the switching module 43 may include any one of the following sub-modules: a determination sub-module 431 and a switching sub-module 432.

The determination sub-module 431 is configured to determine, after the BWP switching information is successfully parsed, whether there is presently scheduled data transmission on the first BWP.

The switching sub-module 432 is configured to switch, in a case that there is presently scheduled data transmission, the first BWP to the second BWP after remaining data transmission is completed.

Figure 19:
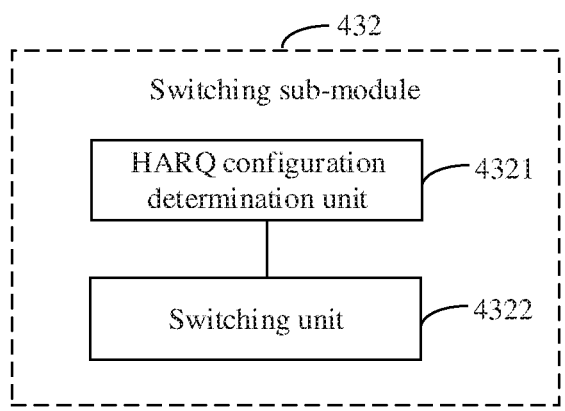
FIG. 19 is a block diagram illustrating UE according to an exemplary embodiment.

In an embodiment, the remaining data transmission may include: remaining downlink data transmission. FIG. 19 is a block diagram illustrating UE according to an exemplary embodiment. On the basis of the UE embodiment shown in FIG. 18, the switching sub-module 432 may include any one of: an HARQ configuration determination unit 4321 and a switching unit 4322.

The HARQ configuration determination unit 4321 is configured to determine HARQ feedback transmission configuration information of the first BWP.

The switching unit 4322 is configured to, in a case that the HARQ feedback transmission configuration information is preset HARQ feedback transmission configuration information, after the remaining data transmission is completed and before HARQ feedback information of the remaining downlink data transmission is sent, switch the UE from the first BWP to the second BWP.

The preset HARQ feedback transmission configuration information may be HARQ feedback information for instructing the UE to send HARQ feedback information transmitted by downlink data carried by the first BWP to the base station through a BWP to be switched.

The apparatus embodiments substantially correspond to the method embodiments, and thus reference may be made to related parts of the description of the method embodiments. The apparatus embodiments described above are only exemplary, modules described as separate parts therein may or may not be physically separated, and parts displayed as modules may be located in the same place or may also be distributed to multiple networks. Part or all of the modules therein may be selected according to a practical requirement to achieve the purpose of the solutions of the present disclosure.

In an exemplary embodiment, a base station includes: a processor; and a memory configured to store executable instructions of the processor, wherein the processor is configured to: send BWP switching information to target UE through an upper layer message, the BWP switching information being configured to instruct the target UE to switch from a first BWP for presently performing information transmission to a second BWP; monitor preset uplink feedback information of the target UE, the preset uplink feedback information being configured to indicate that the target UE has received and/or parsed the BWP switching information; and stop, if the preset uplink feedback information is received, scheduling the target UE on the first BWP.

In an exemplary embodiment, UE includes: a processor; and a memory configured to store executable instructions of the processor, wherein the processor is configured to: receive and parse BWP switching information sent by a base station; send preset uplink feedback information to the base station, the preset uplink feedback information being configured to inform the base station that the BWP switching information has been received and/or parsed; and switch, according to the BWP switching information, the UE from a first BWP for presently performing information transmission to a second BWP.

Figure 20:
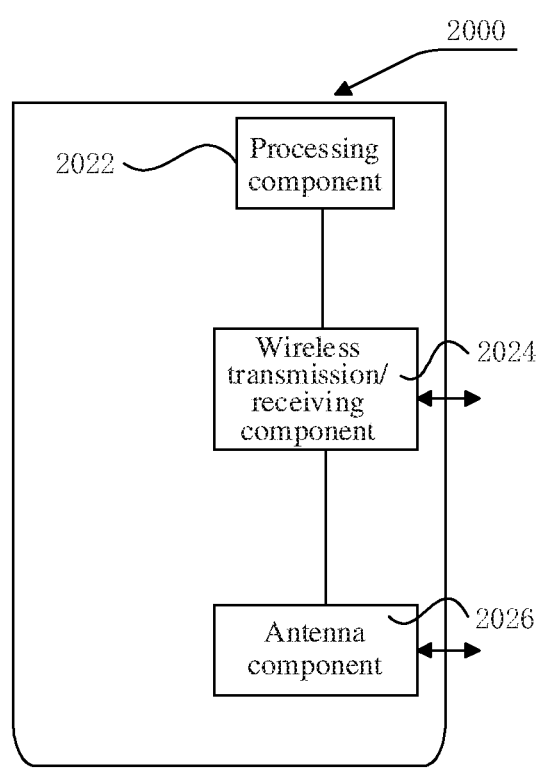
FIG. 20 is a schematic diagram illustrating a base station according to an exemplary embodiment.

FIG. 20 is a schematic diagram of an apparatus 2000 according to an exemplary embodiment. The apparatus 2000 may be a base station in a 5G NR network. Referring to FIG. 20, the apparatus 2000 includes a processing component 2022, a wireless transmission/receiving component 2024, an antenna component 2026 and a wireless interface-specific signal processing part, and the processing component 2022 may further include one or more processors.

One processor in the processing component 2022 may be configured to: send BWP switching information to target UE through an upper layer message, the BWP switching information being configured to instruct the target UE to switch from a first BWP for presently performing information transmission to a second BWP; monitor preset uplink feedback information of the target UE, the preset uplink feedback information being configured to indicate that the target UE has received and/or parsed the BWP switching information; and stop, upon the preset uplink feedback information is received, scheduling the target UE on the first BWP.

In an exemplary embodiment, there is also provided a non-transitory computer readable storage medium having a computer instruction stored thereon. The computer instruction may be executed by the processing component 2022 of the apparatus 2000 to perform the above described methods for adjusting information transmission. For example, the non-transitory computer-readable storage medium may be a ROM, a random access memory (RAM), a CD-ROM, a magnetic tape, a floppy disc, an optical data storage device and the like.

Figure 21:
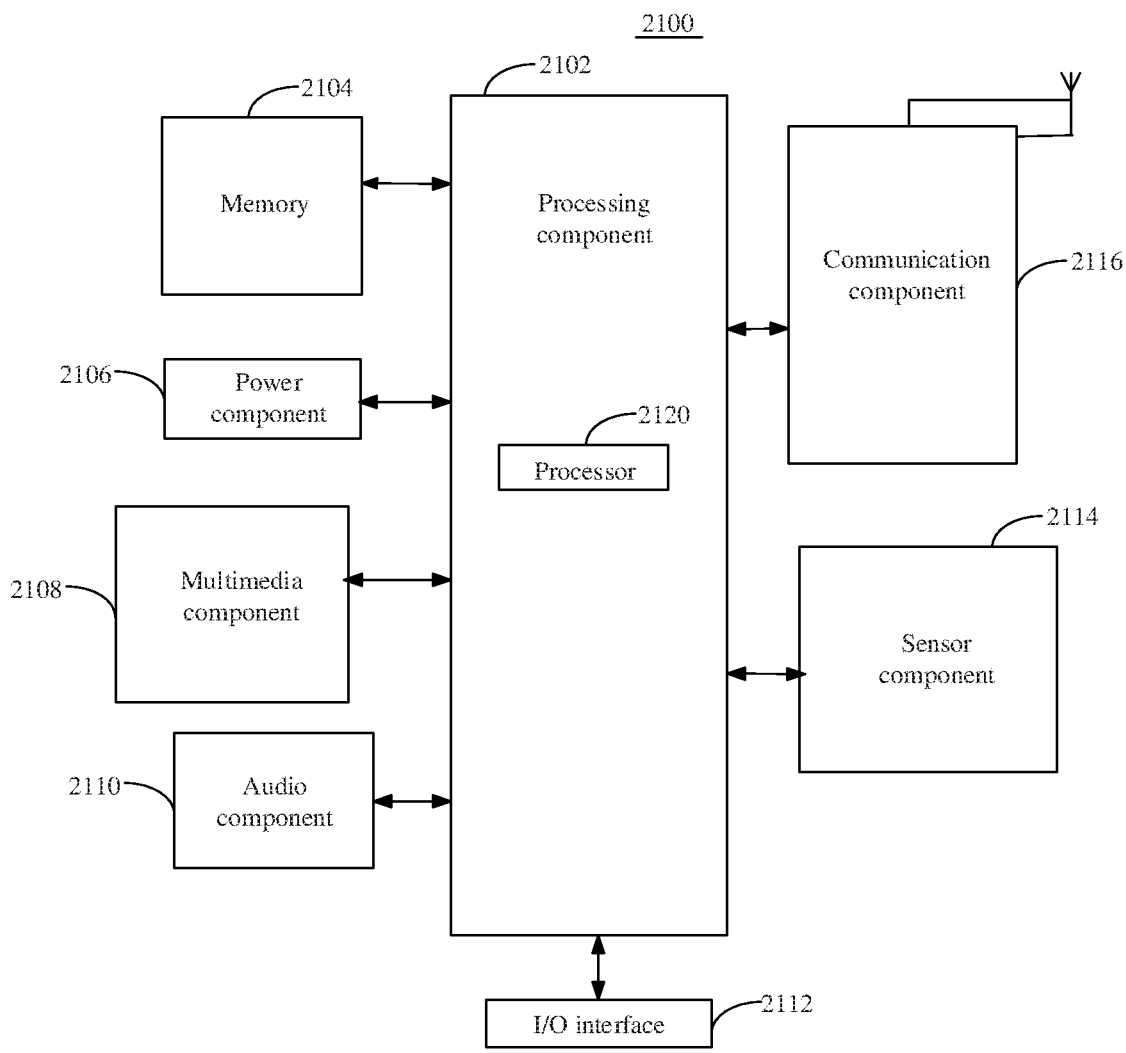
FIG. 21 is a schematic diagram illustrating UE according to an exemplary embodiment.

FIG. 21 is a schematic diagram illustrating an apparatus 2100 according to an exemplary embodiment. For example, the apparatus 2100 may be UE in a 5G NR network, and may be a mobile phone, a computer, a digital broadcast terminal, a messaging device, a gaming console, a tablet, a medical device, exercise equipment, a personal digital assistant, or a wearable device such as a smart watch, smart glasses, a smart bracelet and smart running shoes.

Referring to FIG. 21, the apparatus 2100 may include one or more of the following components: a processing component 2102, a memory 2104, a power component 2106, a multimedia component 2108, an audio component 2110, an input/output (I/O) interface 2112, a sensor component 2114, and a communication component 2116.

The processing component 2102 is typically configured to control overall operations of the apparatus 2100, such as the operations associated with display, telephone calls, data communications, camera operations, and recording operations. The processing component 2102 may include one or more processors 2120 to execute instructions to perform all or part of the steps in the above described methods. Moreover, the processing component 2102 may include one or more modules which facilitate the interaction between the processing component 2102 and other components. For example, the processing component 2102 may include a multimedia module to facilitate the interaction between the multimedia component 2108 and the processing component 2102.

The memory 2104 is configured to store various types of data to support the operation of the apparatus 2100. Examples of such data include instructions for any applications or methods operated on the apparatus 2100, contact data, phonebook data, messages, pictures, video, etc. The memory 2104 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 2106 is configured to provide power to various components of the apparatus 2100. The power component 2106 may include a power management system, one or more power sources, and any other components associated with the generation, management, and distribution of power in the apparatus 2100.

The multimedia component 2108 may include a screen for providing an output interface between the apparatus 2100 and a user. In some embodiments, the screen may include a liquid crystal display (LCD) and a touch panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 2108 may include a front camera and/or a rear camera. The front camera and/or the rear camera may receive external multimedia data when the apparatus 2100 is in an operation mode, such as a photographing mode or a video mode. Each of the front camera and the rear camera may be a fixed optical lens system or have focusing and optical zooming capabilities.

The audio component 2110 is configured to output and/or input audio signals. For example, the audio component 2110 includes a microphone (MIC) configured to receive an external audio signal when the apparatus 2100 is in an operation mode, such as a call mode, a recording mode, and a voice recognition mode. The received audio signal may be further stored in the memory 2104 or transmitted via the communication component 2116. In some embodiments, the audio component 2110 further includes a speaker to output audio signals.

The I/O interface 2112 is configured to provide an interface between the processing component 2102 and peripheral interface modules, such as a keyboard, a click wheel, buttons, and the like. The buttons may include, but are not limited to, a home button, a volume button, a starting button, and a locking button.

The sensor component 2114 may include one or more sensors to provide status assessments of various aspects of the apparatus 2100. For instance, the sensor component 2114 may detect an on/off status of the apparatus 2100 and relative positioning of components, such as a display and small keyboard of the apparatus 2100, and the sensor component 2114 may further detect a change in a position of the apparatus 2100 or a component of the apparatus 2100, presence or absence of contact between the user and the apparatus 2100, orientation or acceleration/deceleration of the apparatus 2100 and a change in temperature of the apparatus 2100. The sensor component 2114 may include a proximity sensor configured to detect presence of an object nearby without any physical contact. The sensor component 2114 may also include a light sensor, such as a complementary metal oxide semiconductor (CMOS) or charge coupled device (CCD) image sensor, configured for use in an imaging application. In some embodiments, the sensor component 2114 may also include an acceleration sensor, a gyroscope sensor, a magnetic sensor, a pressure sensor or a temperature sensor.

The communication component 2116 is configured to facilitate wired or wireless communication between the apparatus 2100 and other devices. The apparatus 2100 can access a wireless network based on a communication standard, such as WiFi, 4G, or 5G, or a combination thereof. In one exemplary embodiment, the communication component 2116 receives a broadcast signal or broadcast associated information from an external broadcast management system via a broadcast channel. In one exemplary embodiment, the communication component 2116 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 2100 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer readable storage medium including instructions, such as included in the memory 2104, executable by the processor 2120 in the apparatus 2100, for performing the above described methods for adjusting information transmission. For example, the non-transitory computer-readable storage medium may be a ROM, a random access memory (RAM), a CD-ROM, a magnetic tape, a floppy disc, an optical data storage device and the like.

According to a first aspect of the embodiments of the present disclosure, a method for adjusting information transmission is provided. The method may be applied to a base station. The method may include that: BWP switching information is sent to target UE through an upper layer message, the BWP switching information being configured to instruct the target UE to switch from a first BWP for presently performing information transmission to a second BWP; preset uplink feedback information of the target UE is monitored, the preset uplink feedback information being configured to indicate that the target UE has received and/or parsed the BWP switching information; and upon the preset uplink feedback information is received, scheduling the target UE on the first BWP is stopped.

In some embodiments, the operation that preset uplink feedback information of the target UE is monitored may include that: after the BWP switching information is sent, scheduling the target UE on the first BWP is continued; uplink information sent by the target UE through the first BWP is received; and the preset uplink feedback information in the uplink information is monitored.

In some embodiments, the preset uplink feedback information may include any one of the following messages: a receiving success message for indicating that the target UE has received the BWP switching information; a parsing success message for indicating that the target UE has successfully parsed the BWP switching information: and a configuration completion message for indicating that the target UE has successfully parsed the BWP switching information and completed transmission configuration of the second BWP according to the BWP switching information.

In some embodiments, the operation that preset uplink feedback information of the target UE is monitored may further include that: after the BWP switching information is sent, scheduling the target UE on the second BWP is started; and uplink information sent by the target UE through the second BWP is monitored.

In some embodiments, the operation that scheduling the target UE on the first BWP is stopped if the preset uplink feedback information is received may include any one of the following operations: upon the receiving success message is received, scheduling the target UE on the second BWP is started, and scheduling the target UE on the first BWP is stopped after a first preset waiting duration; upon the parsing success message is received, scheduling the target UE on the first BWP is stopped after a second preset waiting duration, and scheduling the target UE on the second BWP is started; upon the configuration completion message is received, scheduling the target UE on the first BWP is stopped, and scheduling the target UE on the second BWP is started; and upon uplink information sent by the target UE through the second BWP is received, scheduling the target UE on the first BWP is stopped.

In some embodiments, the method may further include that: before or when the BWP switching information is sent, preset hybrid automatic repeat request (HARQ) feedback configuration information is sent to the target UE, the preset HARQ feedback configuration information being configured to instruct the target UE to send HARQ feedback information transmitted by downlink data carried by the first BWP to the base station through the second BWP.

According to a second aspect of the embodiments of the present disclosure, a method for adjusting information transmission is provided. The method may be applied to UE. The method may include: receiving and parsing BWP switching information sent by a base station; sending preset uplink feedback information to the base station, the preset uplink feedback information being configured to inform the base station that the BWP switching information has been received and/or parsed; and switching from a first BWP for presently performing information transmission to a second BWP according to the BWP switching information.

In some embodiments, the operation that uplink feedback information is sent to the base station may include any one of the following operations: after the BWP switching information is received, a receiving success message is sent to the base station through the first BWP; after the BWP switching information is successfully parsed, a parsing success message is sent to the base station through the first BWP; after configuration of scheduling control information of the second BWP is completed according to the parsed BWP switching information, a configuration completion message is sent to the base station through the first BWP; and after the second BWP is activated according to the BWP switching information, downlink information is sent to the base station through the second BWP.

In some embodiments, the switching from a first BWP for presently performing information transmission to a second BWP may include that: after the BWP switching information is successfully parsed, determining whether there is presently scheduled data transmission on the first BWP; and in a case that there is presently scheduled data transmission, after remaining data transmission is completed, switching from the first BWP to the second BWP.

In some embodiments, the remaining data transmission may include: remaining downlink data transmission.

The operation of switching from the first BWP to the second BWP after remaining data transmission is completed may include that: determining HARQ feedback transmission configuration information of the first BWP; and in a case that the HARQ feedback transmission configuration information is preset HARQ feedback transmission configuration information, after the remaining data transmission is completed and before HARQ feedback information of the remaining downlink data transmission is sent, switching from the first BWP to the second BWP.

The preset HARQ feedback transmission configuration information may be HARQ feedback information for instructing the UE to send HARQ feedback information transmitted by downlink data carried by the first BWP to the base station through a BWP to be switched.

According to a third aspect of the embodiments of the present disclosure, a base station is provided, which may include: a switching information sending module, configured to send BWP switching information to target UE through an upper layer message, the BWP switching information being configured to instruct the target UE to switch from a first BWP for presently performing information transmission to a second BWP; a monitoring module, configured to monitor preset uplink feedback information of the target UE, the preset uplink feedback information being configured to indicate that the target UE has received and/or parsed the BWP switching information; and a switching module, configured to stop, upon the preset uplink feedback information is received, scheduling the target UE on the first BWP.

In some embodiments, the monitoring module may include: a first scheduling sub-module, configured to, after the BWP switching information is sent, continue scheduling the target UE on the first BWP; an information receiving sub-module, configured to receive uplink information sent by the target UE through the first BWP; and a first monitoring sub-module, configured to monitor the preset uplink feedback information in the uplink information.

In some embodiments, the preset uplink feedback information may include any one of the following messages: a receiving success message, for indicating that the target UE has received the BWP switching information; a parsing success message, for indicating that the target UE has successfully parsed the BWP switching information; and a configuration completion message, for indicating that the target UE has successfully parsed the BWP switching information and completed transmission configuration of the second BWP according to the BWP switching information.

In some embodiments, the monitoring module may further include: a second scheduling sub-module, configured to, after the BWP switching information is sent, start to schedule the target UE on the second BWP; and a second monitoring sub-module, configured to monitor uplink information sent by the target UE through the second BWP.

In some embodiments, the switching module may include any one of the following sub-modules: a first switching sub-module, configured to start, upon the receiving success message is received, to schedule the target UE on the second BWP, and stop scheduling the target UE on the first BWP after a first preset waiting duration; a second switching sub-module, configured to stop, upon the parsing success message is received, scheduling the target UE on the first BWP after a second preset waiting duration, and start to schedule the target UE on the second BWP; a third switching sub-module, configured to stop, upon the configuration completion message is received, scheduling the target UE on the first BWP, and start to schedule the target UE on the second BWP; and a fourth switching sub-module, configured to stop, upon uplink information sent by the target UE through the second BWP is received, scheduling the target UE on the first BWP.

In some embodiments, the base station may further include: an HARQ configuration sending module, configured to, before or when the BWP switching information is sent, send preset HARQ feedback configuration information to the target UE, the preset HARQ feedback configuration information being configured to instruct the target UE to send HARQ feedback information transmitted by downlink data carried by the first BWP to the base station through the second BWP.

According to a fourth aspect of the embodiments of the present disclosure, UE is provided, which may include: a switching information receiving module, configured to receive and parse BWP switching information sent by a base station; a feedback module, configured to send preset uplink feedback information to the base station, the preset uplink feedback information being configured to inform the base station that the BWP switching information has been received and/or parsed; and a switching module, configured to switch, according to the BWP switching information, a first BWP for presently performing information transmission to a second BWP.

In some embodiments, the feedback module may include any one of the following sub-modules: a first feedback sub-module, configured to, after the BWP switching information is received, send a receiving success message to the base station through the first BWP; a second feedback sub-module, configured to, after the BWP switching information is successfully parsed, send a parsing success message to the base station through the first BWP; a third feedback sub-module, configured to, after the configuration of scheduling control information of the second BWP is completed according to the parsed BWP switching information, send a configuration completion message to the base station through the first BWP; and a fourth feedback sub-module, configured to, after activating the second BWP according to the BWP switching information, send downlink information to the base station through the second BWP.

In some embodiments, the switching module may include: a determination sub-module, configured to determine, after the BWP switching information is successfully parsed, whether there is presently scheduled data transmission on the first BWP; and a switching sub-module, configured to, in a case that there is presently scheduled data transmission, switch the first BWP to the second BWP after remaining data transmission is completed.

In some embodiments, the remaining data transmission may include: remaining downlink data transmission.

The switching sub-module may include: an HARQ configuration determination unit, configured to determine HARQ feedback transmission configuration information of the first BWP; and a switching unit, configured to, in a case that the HARQ feedback transmission configuration information is preset HARQ feedback transmission configuration information, after the remaining data transmission is completed and before HARQ feedback information of the remaining downlink data transmission is sent, switch the first BWP to the second BWP.

The preset HARQ feedback transmission configuration information may be HARQ feedback information for instructing the UE to send HARQ feedback information transmitted by downlink data carried by the first BWP to the base station through a BWP to be switched.

According to a fifth aspect of the embodiments of the present disclosure, a non-transitory computer readable storage medium is provided, which may have a computer instruction stored thereon that, when executed by a processor, can implement the steps of any of the methods as described in the first aspect.

According to a sixth aspect of the embodiments of the present disclosure, a non-transitory computer readable storage medium is provided, which may have a computer instruction stored thereon which, when executed by a processor, can implement the steps of any of the methods as described in the second aspect.

According to a seventh aspect of the embodiments of the present disclosure, a base station is provided, which may include: a processor; and a memory configured to store executable instructions of the processor, where the processor is configured to: control a transceiver to send BWP switching information to target UE through an upper layer message, the BWP switching information being configured to instruct the target UE to switch from a first BWP for presently performing information transmission to a second BWP; monitor preset uplink feedback information of the target UE, the preset uplink feedback information being configured to indicate that the target UE has received and/or parsed the BWP switching information; and stop, upon the preset uplink feedback information is received, scheduling the target UE on the first BWP.

According to an eighth aspect of the embodiments of the present disclosure, UE is provided, which may include: a processor; and a memory configured to store executable instructions of the processor, where the processor is configured to: control a transceiver to receive and parse BWP switching information sent by a base station; control a transceiver to send preset uplink feedback information to the base station, the preset uplink feedback information being configured to inform the base station that the BWP switching information has been received and/or parsed; and switch, according to the BWP switching information, a first BWP for presently performing information transmission to a second BWP.

The technical solutions provided by the embodiments of the present disclosure may include the following beneficial effects:

In the embodiments of the present disclosure, according to the method for adjusting information transmission provided by the present disclosure, after a base station sends a BWP switching message to target UE through an upper layer message, a status that BWP switching is completed by the target UE can be clearly determined by monitoring preset uplink feedback information, so that after the preset uplink feedback information is received, scheduling the target UE on a first BWP is canceled, and scheduling the target UE on a second BWP is started or maintained, thereby effectively avoiding information transmission loss caused by stopping scheduling the target UE on the first BWP too early or too late due to the fact that the base station cannot determine whether the target UE has received and parsed the BWP switching message, ensuring that the target UE will not lose information transmission in a BWP handover process, and effectively improving the reliability of information transmission in a BWP handover process.

Other implementation solutions of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for adjusting information transmission, applied to a base station, the method comprising:
sending bandwidth part (BWP) switching information to user equipment (UE) through an upper layer message, the BWP switching information being configured to instruct the UE to switch from a first BWP for presently performing information transmission to a second BWP;
monitoring preset uplink feedback information of the UE, the preset uplink feedback information being configured to indicate that the UE has received and parsed the BWP switching information; and
stopping, upon receiving the preset uplink feedback information, scheduling the UE on the first BWP.

2. The method according to claim 1, wherein the monitoring preset uplink feedback information of the UE comprises:
after sending the BWP switching information, continuing scheduling the UE on the first BWP;
receiving uplink information sent by the UE through the first BWP; and
monitoring the preset uplink feedback information in the uplink information.

3. The method according to claim 2, wherein the preset uplink feedback information comprises any one of:

a receiving success message for indicating that the UE has received the BWP switching information;
a parsing success message for indicating that the UE has successfully parsed the BWP switching information; and
a configuration completion message for indicating that the UE has successfully parsed the BWP switching information and completed transmission configuration of the second BWP according to the BWP switching information.

4. The method according to claim 2, wherein the monitoring preset uplink feedback information of the UE further comprises:
after sending the BWP switching information, starting to schedule the UE on the second BWP; and
monitoring uplink information sent by the UE through the second BWP.

5. The method according to claim 3, wherein the stopping, upon receiving the preset uplink feedback information, scheduling the UE on the first BWP comprises any one of:
upon receiving the receiving success message, starting to schedule the UE on the second BWP, and stopping scheduling the UE on the first BWP after a first preset waiting duration;
upon receiving the parsing success message, stopping scheduling the UE on the first BWP after a second preset waiting duration, and starting to schedule the UE on the second BWP;
upon receiving the configuration completion message, stopping scheduling the UE on the first BWP, and starting to schedule the UE on the second BWP; and
upon receiving uplink information sent by the UE through the second BWP, stopping scheduling the UE on the first BWP.

6. The method according to claim 1, further comprising:
before or when sending the BWP switching information, sending preset hybrid automatic repeat request (HARQ) feedback configuration information to the UE, the preset HARQ feedback configuration information being configured to instruct the UE to send HARQ feedback information for downlink data carried by the first BWP to the base station through the second BWP.

7. A method for adjusting information transmission, applied to user equipment (UE), the method comprising:
receiving and parsing bandwidth part (BWP) switching information sent by a base station;
sending preset uplink feedback information to the base station, the preset uplink feedback information being configured to inform the base station that the BWP switching information has been received and parsed; and
switching, according to the BWP switching information, from a first BWP for presently performing information transmission to a second BWP,
wherein the switching from the first BWP for presently performing information transmission to the second BWP comprises:
after successfully parsing the BWP switching information, determining whether there is presently scheduled data transmission on the first BWP; and
when there is presently scheduled data transmission, switching from the first BWP to the second BWP after completing remaining data transmission.

8. The method according to claim 7, wherein the sending uplink feedback information to the base station comprises any one of:

after receiving the BWP switching information, sending a receiving success message to the base station through the first BWP;
after successfully parsing the BWP switching information, sending a parsing success message to the base station through the first BWP;
after completing configuration of scheduling control information of the second BWP according to the parsed BWP switching information, sending a configuration completion message to the base station through the first BWP; and
after switching to the second BWP according to the BWP switching information, sending downlink information to the base station through the second BWP.

9. The method according to claim 7, wherein the remaining data transmission comprises: remaining downlink data transmission; and
the switching from the first BWP to the second BWP after completing remaining data transmission comprises:
determining hybrid automatic repeat request (HARQ) feedback transmission configuration information of the first BWP; and
when the HARQ feedback transmission configuration information is preset HARQ feedback transmission configuration information, after completing the remaining data transmission and before sending HARQ feedback information of the remaining downlink data transmission, switching from the first BWP to the second BWP,
wherein the preset HARQ feedback transmission configuration information is HARQ feedback information for instructing the UE to send HARQ feedback information for downlink data carried by the first BWP to the base station through the second BWP.

10. A base station, comprising:
a processor; and
a memory storing instructions executable by the processor,
wherein the processor is configured to:
send bandwidth part (BWP) switching information to UE through an upper layer message, the BWP switching information being configured to instruct the UE to switch from a first BWP for presently performing information transmission to a second BWP;
monitor preset uplink feedback information of the UE, the preset uplink feedback information being configured to indicate that the UE has received and parsed the BWP switching information; and
stop, upon receiving the preset uplink feedback information, scheduling the UE on the first BWP.

11. The base station according to claim 10, wherein the processor is further configured to:
after sending the BWP switching information, continue scheduling the UE on the first BWP;
receive uplink information sent by the UE through the first BWP; and
monitor the preset uplink feedback information in the uplink information.

12. The base station according to claim 11, wherein the preset uplink feedback information comprises any one of:
a receiving success message for indicating that the UE has received the BWP switching information;
a parsing success message for indicating that the UE has successfully parsed the BWP switching information; and
a configuration completion message for indicating that the UE has successfully parsed the BWP switching information and completed transmission configuration of the second BWP according to the BWP switching information.

13. The base station according to claim 11, wherein the processor is further configured to:
   after sending the BWP switching information, start to schedule the UE on the second BWP; and
   monitor uplink information sent by the UE through the second BWP.

14. The base station according to claim 12, wherein the processor is further configured to:
   upon receiving the receiving success message, start to schedule the UE on the second BWP, and stop scheduling the UE on the first BWP after a first preset waiting duration;
   upon receiving the parsing success message, stop scheduling the UE on the first BWP after a second preset waiting duration, and start to schedule the UE on the second BWP;
   upon receiving the configuration completion message, stop scheduling the UE on the first BWP, and start to schedule the UE on the second BWP; and
   upon receiving uplink information sent by the UE through the second BWP, stop scheduling the UE on the first BWP.

15. The base station according to claim 10, wherein the processor is further configured to:
   before or when sending the BWP switching information, send preset HARQ feedback configuration information to the UE, the preset HARQ feedback configuration information being configured to instruct the UE to send HARQ feedback information for downlink data carried by the first BWP to the base station through the second BWP.

16. User equipment (UE), comprising:
   a processor; and
   a memory storing instructions executable by the processor,
   wherein the processor is configured to:
   receive and parse bandwidth part (BWP) switching information sent by a base station;
   send preset uplink feedback information to the base station, the preset uplink feedback information being configured to inform the base station that the BWP switching information has been received and parsed; and
   switch, according to the BWP switching information, from a first BWP for presently performing information transmission to a second BWP,
   wherein the processor is further configured to:
   determine, after the BWP switching information is successfully parsed, whether there is presently scheduled data transmission on the first BWP; and
   when there is presently scheduled data transmission, switch from the first BWP to the second BWP after completing remaining data transmission.

17. The UE according to claim 16, wherein the processor is further configured to perform any one of:
   after receiving the BWP switching information, sending a receiving success message to the base station through the first BWP;
   after successfully parsing the BWP switching information, sending a parsing success message to the base station through the first BWP;
   after completing configuration of scheduling control information of the second BWP according to the parsed BWP switching information, sending a configuration completion message to the base station through the first BWP; and
   after switching to the second BWP according to the BWP switching information, sending downlink information to the base station through the second BWP.

18. The UE according to claim 16, wherein the remaining data transmission comprises: remaining downlink data transmission; and the processor is further configured to:
   determine HARQ feedback transmission configuration information of the first BWP; and
   when the HARQ feedback transmission configuration information is preset HARQ feedback transmission configuration information, after completing the remaining data transmission and before sending HARQ feedback information of the remaining downlink data transmission, switch from the first BWP to the second BWP,
   wherein the preset HARQ feedback transmission configuration information is HARQ feedback information for instructing the UE to send HARQ feedback information for downlink data carried by the first BWP to the base station through the second BWP.

* * * * *